United States Patent [19]

Pospischil

[11] Patent Number: 5,123,010
[45] Date of Patent: Jun. 16, 1992

[54] METHOD FOR THE THROUGH-CONNECTION OF MULTIPLEX SIGNALS VIA CROSS CONNECTORS

[75] Inventor: Reginhard Pospischil, Locham, Fed. Rep. of Germany

[73] Assignee: Siemens Aktiengesellschaft, Berlin and Munich, Fed. Rep. of Germany

[21] Appl. No.: 539,890

[22] Filed: Jun. 18, 1990

[30] Foreign Application Priority Data

Jul. 13, 1989 [DE] Fed. Rep. of Germany ....... 3923172

[51] Int. Cl.⁵ .............................................. H04J 3/00
[52] U.S. Cl. .................................. 370/58.1; 370/110.1
[58] Field of Search ............ 370/58.1, 84, 102, 105.1, 370/110.1

[56] References Cited

U.S. PATENT DOCUMENTS 3,982,077 9/1976 Clark et al. ........................... 370/84

OTHER PUBLICATIONS

"Synchronous Digital Hierarchy Bit Rates" CCITT, (not dated) pp. 76–174.
"Considerations About G709 Multiplexing Structure" Jun., 1989, pp. 1–9, France Telecom.

Primary Examiner—Douglas W. Olms
Assistant Examiner—Melvin Marcelo
Attorney, Agent, or Firm—Hill, Van Santen, Steadman & Simpson

[57] ABSTRACT

Method for the through-connection of multiplex signals via cross-connectors, whereby the data of different multiplexing levels ordered in data blocks are converted into cross-connect data blocks that are ordered in a fixed superframe, whereby frequency deviations between external signals and the superframe are compensated by filling.

22 Claims, 11 Drawing Sheets

METHOD FOR THE THROUGH-CONNECTION OF MULTIPLEX SIGNALS VIA CROSS CONNECTORS

BACKGROUND OF THE INVENTION

The present invention is directed to a method for the through-connection of multiplex signals via cross connectors.

In a digital connecting network of a synchronous digital hierarchy (SDH) according to the CCITT recommendations G.707, G.708 and G.709, the digital signals to be transmitted are inserted into specific data blocks, referred to as synchronous containers C-n, by positive filling at the input node to the synchronous network. Each container is supplemented to form a virtual container VC-n by attaching an auxiliary signal (POH). The virtual containers are periodically transmitted. The first byte of a virtual container is indicated by a pointer whose chronological position is defined in the transmission frame. As a rule, the virtual container of a higher hierarchy level serves as transmission frame. Together with the pointer allocated to it, a virtual container VC-n forms a tributary unit TU-n. A plurality of tributary units having the same structure can in turn be combined to form a tributary unit group TUG-n. In the aforementioned CCITT recommendations, only the tributary unit groups TUG-21 for the 1.5 Mbit/s hierarchy (USA) and the TUG-22 for the 2 Mbit/s hierarchy that, among other things, is standard in Europe are expressly cited. Tributary unit groups of a higher order may be seen in the figures of the CCITT recommendation G.709.

The CCITT recommendation is used for the definition of higher tributary unit groups TUG-31 and TUG-32 in a disclosure of France Telecom for CCITT having the title "Considerations about G.709 Multiplexing Structure" presented at the conference in Geneva, Jun. 19-30, 1989.

Figure 1:
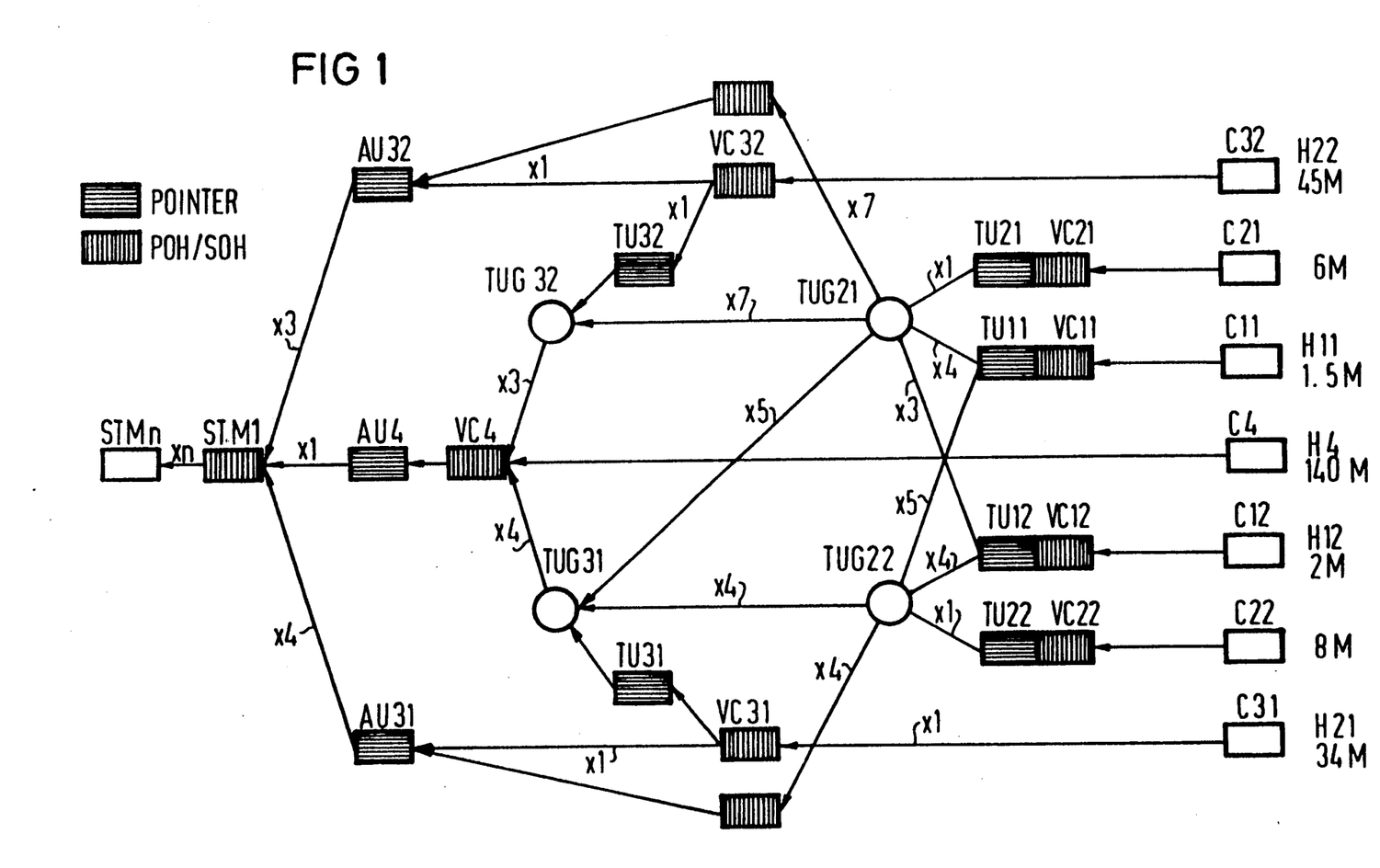
FIG. 1 depicts a multiplex pattern.

The French proposal for the formation of a synchronous transmission signal STM-1 is shown in FIG. 1. Various plesiochronic signals H11 through H22 (M therein denotes Mbit/s) indicated at the right-hand side can be combined via various multiplexing paths to form the synchronous transmission signal STM-1. The arrow directions in FIG. 1 thereby respectively indicate the direction to a more complex multiplex signal or, respectively, to a multiplex signal of a higher level. The same multiplexing path must be employed at both sides of a digital connection. The multiplexing paths for signals of the 1.5 Mbit/s hierarchy (USA) are shown in the upper half and the multiplexing paths of the 2 Mbit/s hierarchy are shown in the lower half. The STM-1 frame has a period of 8 KHz and consists of 270 columns and 9 rows, corresponding to 270×9 bytes. Directly or indirectly via further pointers, the frame identifier word thereby defines the position of all required pointers of the data blocks to be transmitted.

What are referred to as cross connectors (CC) are provided in the trunk line network (FIG. 2), these cross connectors (CC) making it possible to connect multiplex signals over various connecting paths. The cross connectors can thereby undertake the through-connection with a mechanical or electronic switching matrix network. This can be a synchronous space switching matrix network, a synchronous time slot switching matrix network, a time slot-coupled space switching matrix network or a combination thereof. Telephone subscribers having dedicated connections or switched connections (F +W) are essentially referred to herein as subscribers, and have access to the trunk line network either directly or via a switching level.

Whereas through-connections or call transfers can be undertaken in every hierarchy level (multiplexing level) in the plesiochronic hierarchy, no interfaces are standardized in the synchronous hierarchy between the individual hierarchy levels below the STM-1 signal of 155.520 Mbit/s, this initially making a through-connection and call transfer impossible.

Desired switching levels in the 2 Mbit/s hierarchy should be provided for the data blocks TU-12, TU-22, TUG-22, TU-31, TUG-31, AU-31 and AU-4. In the 1.5 Mbit/s hierarchy, the corresponding switching levels would be desirable for data blocks TU-11, TU-21, TUG-21, TU-32, TUG-32, AU-32 and AU-4. With the exception of the switching level AU-4 (administrative units that, however, are not the subject matter of the invention), the switching levels for the 2 Mbit/s hierarchy and for the 1.5 Mbit/s hierarchy require different equipment.

SUMMARY OF THE INVENTION

It is an object of the present invention to provide a method that enables the through-connection of multiplex signals of the synchronous digital hierarchy. Suitable pulse frames are also set forth.

This object is achieved by a method of the present invention comprising the steps of: converting data blocks of different multiplexing levels into cross-connect data blocks (TU-12, TU-22, TUG-22, TU-31; TUG-21, TU-32, TUG-32); ordering the cross-connect data blocks in a fixed superframe; and compensating frequency deviations between external data signals and the superframe by filling.

Advantageous developments of the present invention and suitable pulse frames are also disclosed herein.

The conversion of the multiplex signals of different levels into cross-connect data blocks is advantageous, these then being inserted into an internal pulse frame with an internal pulse frequency. Frequency deviations between signal sources and the through-connect points are compensated by positive-zero-negative filling. The same superframe is always provided for all data blocks of this multiplex level or, respectively, for a corresponding plurality of data blocks of a lower level, whereby the starts of the data blocks are identified by pointers.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several FIGS. in which like reference numerals identify like elements, and in which:

DESCRIPTION OF THE PREFERRED EMBODIMENT

Figure 2:
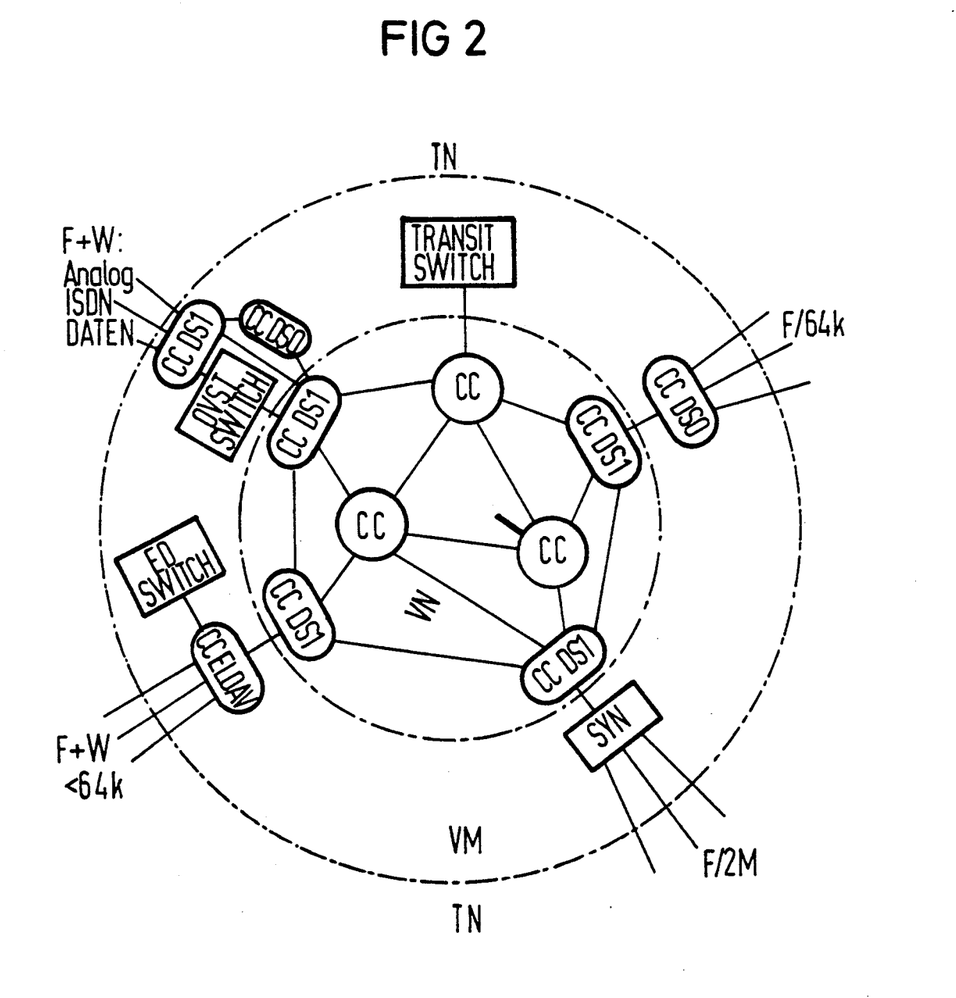
FIG. 2 depicts a fundamental circuit diagram of a digital network structure.

FIG. 1 shows the multiplex structure both for the 2 Mbit/s hierarchy as well as for the 1.5 Mbit/s hierarchy. FIG. 2 depicts a fundamental circuit diagram of a digital network structure which utilizes the method of the present invention. The reference 2M thereby denotes a data rate of approximately 2 Mbit/s. The virtual containers C (C32, C21, C11, C4, C12, C22, C31) are periodically transmitted and combined into larger data blocks. A number of possibilities are thereby established. For example, four tributary units TU-12 can form one tributary unit group TUG-22 or one TU-22 can be inserted into one TUG-22. Further examples thereof may be derived from FIG. 1 and from the initially cited CCITT recommendations.

Figure 3:
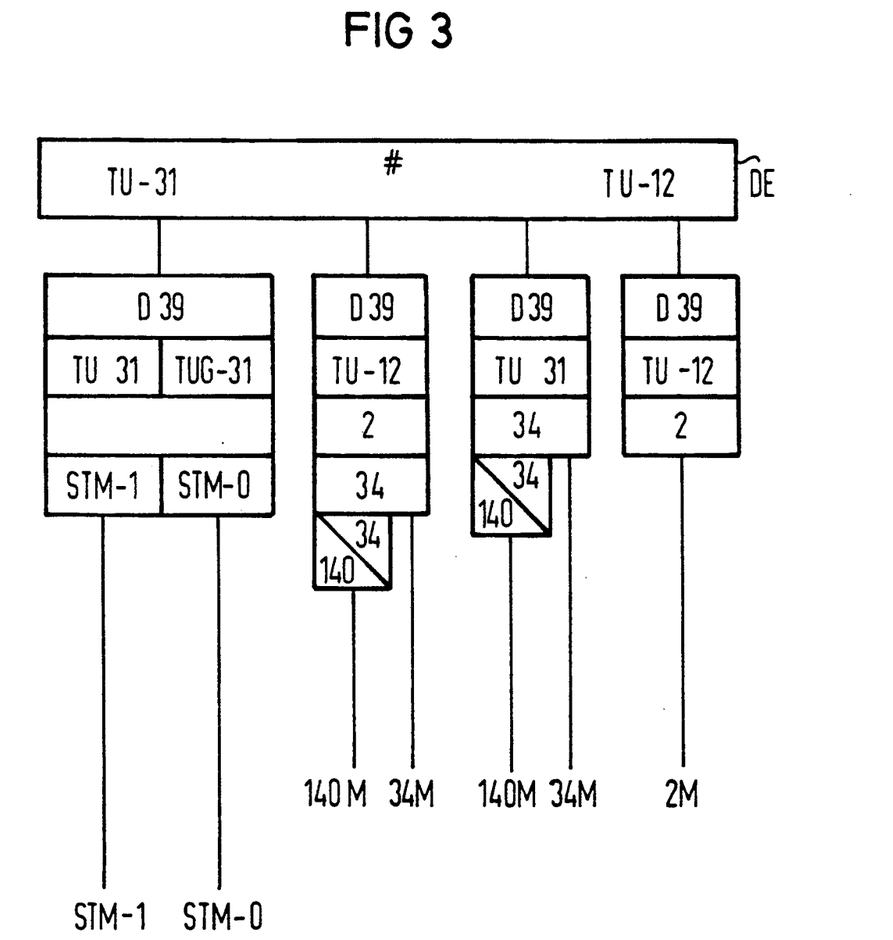
FIG. 3 depicts a conversion pattern for the various multiplex signals into signals of the internal pulse frame.

FIG. 3 shows a fundamental circuit diagram for converting the received signals into through-connectible signals DS 39 (DS 39 digital signal) of the through-connection level DE. For example, a plurality of signals (2 Mbit/s) are thereby combined to form the DS 39 signal that shall be discussed in detail later, whereas signals having a higher data rate are divided into a plurality of DS 39 signals or are converted into DS 39 signals. The pattern shown in FIG. 3, of course, is also valid for the combination and division of throughconnected DS 39 signals. The STM-0 signal has not yet been defined. It has one-fourth the data rate of the STM-0 signal.

There is the following problem in the desired switching levels: all forms of the data blocks can be further-processed only when ordered in a fixed frame. All signals having different origins must therefore be synchronized to the network node clocks.

The received data blocks are ordered in a superframe with phase and frequency compensation (buffer memory, pointer action, i.e. modification of the spacing address recited by the pointer and by positive-zero-negative filling). Upon through-connection, all data blocks newly combined in the superframe such as TUs, TUGs or, respectively, AUs must be ordered into the respective time slots that are then allocated to them. Taking the superframe structure into consideration, all pointers must be arranged in time slots provided therefor for this purpose. For monitoring the matrix path, moreover, an identifier must be attached to every signal to be throughconnected.

A suitable frame structure can be respectively found both for the 2 Mbit/s hierarchy as well as for the 1.5 Mbit/s hierarchy that allows all TUs or, respectively, TUGs to be respectively through-connected via a single time slotcontrolled switching matrix network.

Figure 4:
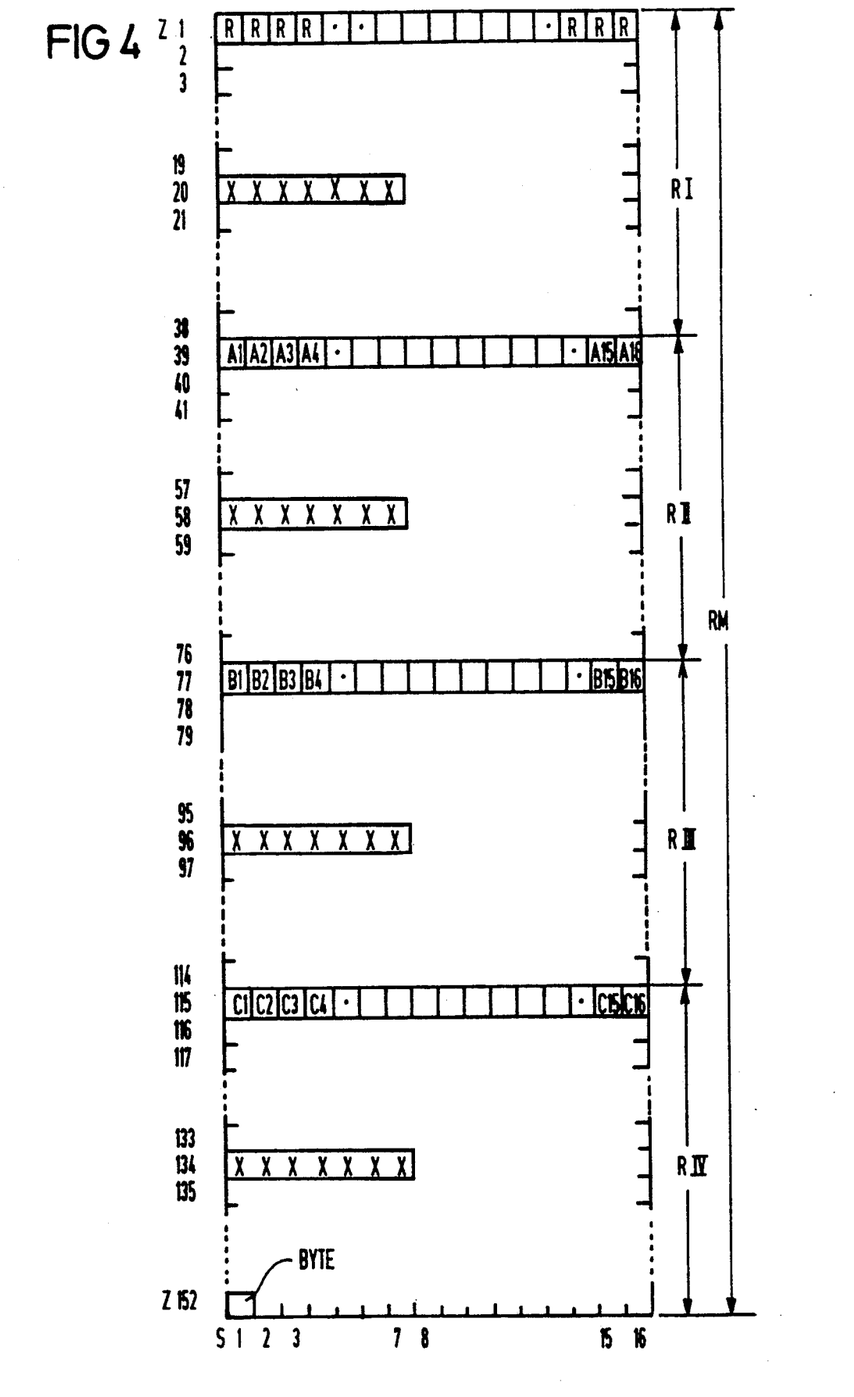
FIG. 4 depicts a superframe for the 2 Mbit/s hierarchy.

FIG. 4 shows the superframe of the present invention for the 2 Mbit/s hierarchy. In two-dimensional portrayal, the superframe RM consists of 152 rows each having 16 columns. It is subdivided into 4 frames RI through RIV each of which contains 38 rows with 16 columns, i.e. 38×16 bytes. The transmission occurs row-by-row, beginning with byte 1 in row Z1 and column S1. For a superframe period of 2 kHz, the transmission rate amounts to 38 912 kbit/s (19×20 48 kbit/s). This transmission signal is the signal referenced DS 39.

A frame identifier RRR... is transmitted in the first row Z1 of the first frame RI. The first rows of the other frames RII through RIV and the first 7 bytes of an additional row, here the respectively 20th row of every frame, are available for monitoring and management jobs (data A, B, C and x). The net transmission capacity of each frame thus amounts to 65×9 bytes. This exactly corresponds to the transmission rate of a tributary unit TU-31.

Only 64×9 bytes are required for the transmission of one TUG-31, composed of four TUG-22 or of 16 Tu-12. All data blocks insertable into the superframe are referred to here as cross-connect data blocks. No transmission capacity is required in the above instances in the auxiliary row (every 20th row of a frame here). This row, however, is always retained in order to obtain the same frame structure for all signals.

The frame structure with the auxiliary rows and the rows for monitoring and management is defined with the frame identifier in row one of the superframe or, respectively, of the frame RI. Simultaneously, the position of the pointer in the frame or, respectively, in the superframe is arbitrarily defined with the frame identifier.

A TU-31 pointer is composed of three bytes V1, V2 and V3 that assume the same position in each of the frames RI-RIV. Which three time slots are used only has to be standardized when the signal packed in the frame is to be conducted via an external interface. The bytes V1 and V2 indicate the position of the allocated data blocks. V3 is used a "action byte" for filling operations. In the following examples, the TU-31 pointers are arranged in the time slots 8, 9 and 10 of the auxiliary rows. In the tributary unit group TUG-22, the pointer is composed of 4 successive TU-12 pointers; in the case of TU-31, the pointer is composed of 16 successive TU-12 pointers and each individual pointer is in turn composed of four bytes V1-V4 that are distributed in the sequence onto the frames RI-RIV. This means that all 16 bytes V1 of a TUG-31 make use of a full row in the frame RI; the 16 bytes V2 make use of a row in the frame RII. The analogous case applies to the bytes V3 and V4 in the frames RIII and RIV. Which row number is employed in the frame is basically irrelevant. For the sake of a surveyable illustration, the bytes are respectively arranged in the second row of every frame in the following examples.

The first rows of the frames RII and RIII are preferably used for signal addresses for monitoring the matrix path, whereas the bytes of the first row of the frame RIV can be employed for quality monitoring of the matrix paths.

Figure 5:
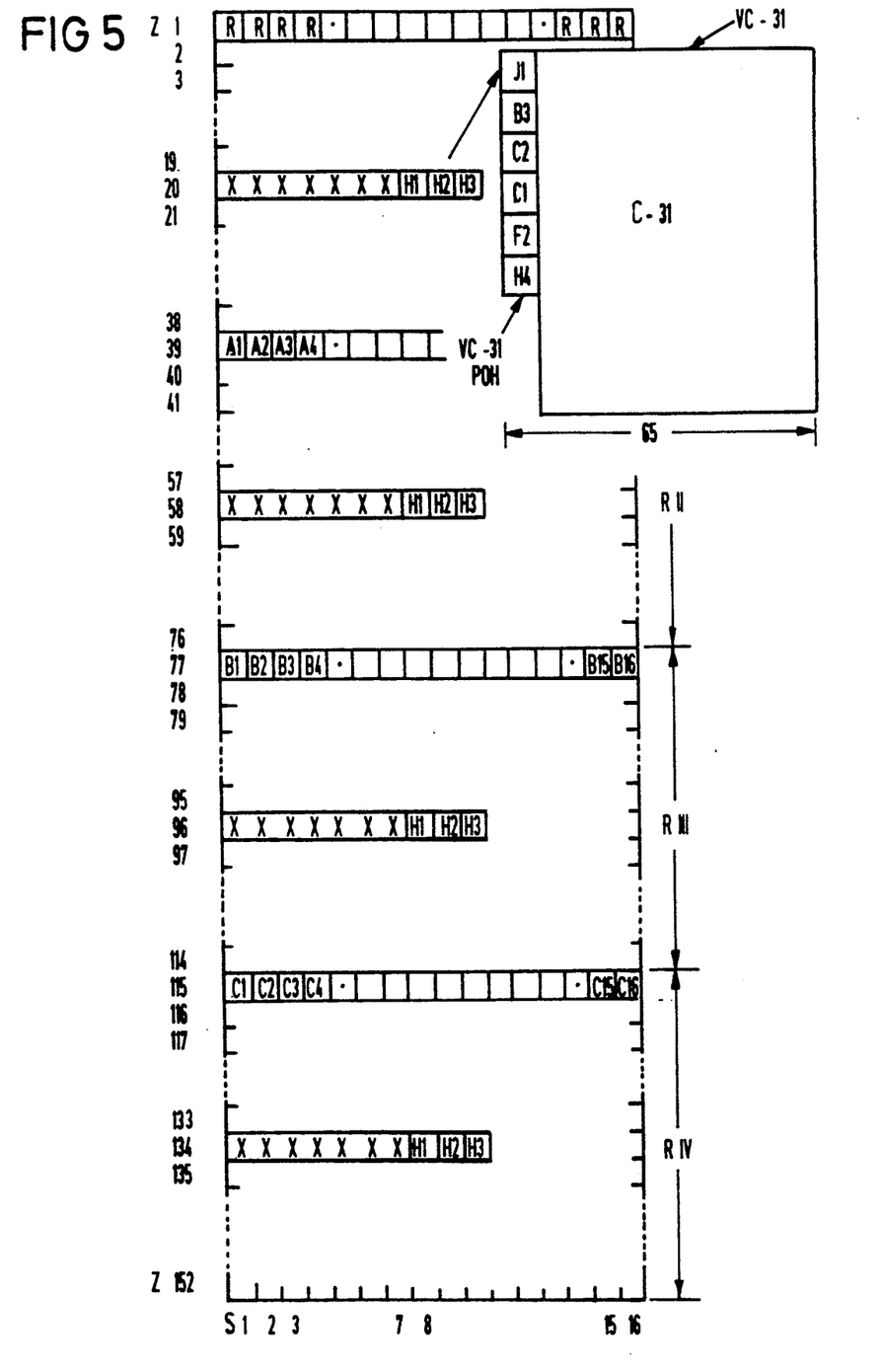
FIG. 5 depicts the insertion of a virtual container VC-31.

FIG. 5 shows the insertion of a TU-31 into the superframe. The appertaining pointer H1, H2, H3 is classified in three bytes (column 8, 9 and 10) of the auxiliary row. The pointer defines the position of the first byte (JI) of the virtual container VC-31.

Overall, four data blocks of a TU-31 signal can be inserted into the superframe RM.

Figure 6:
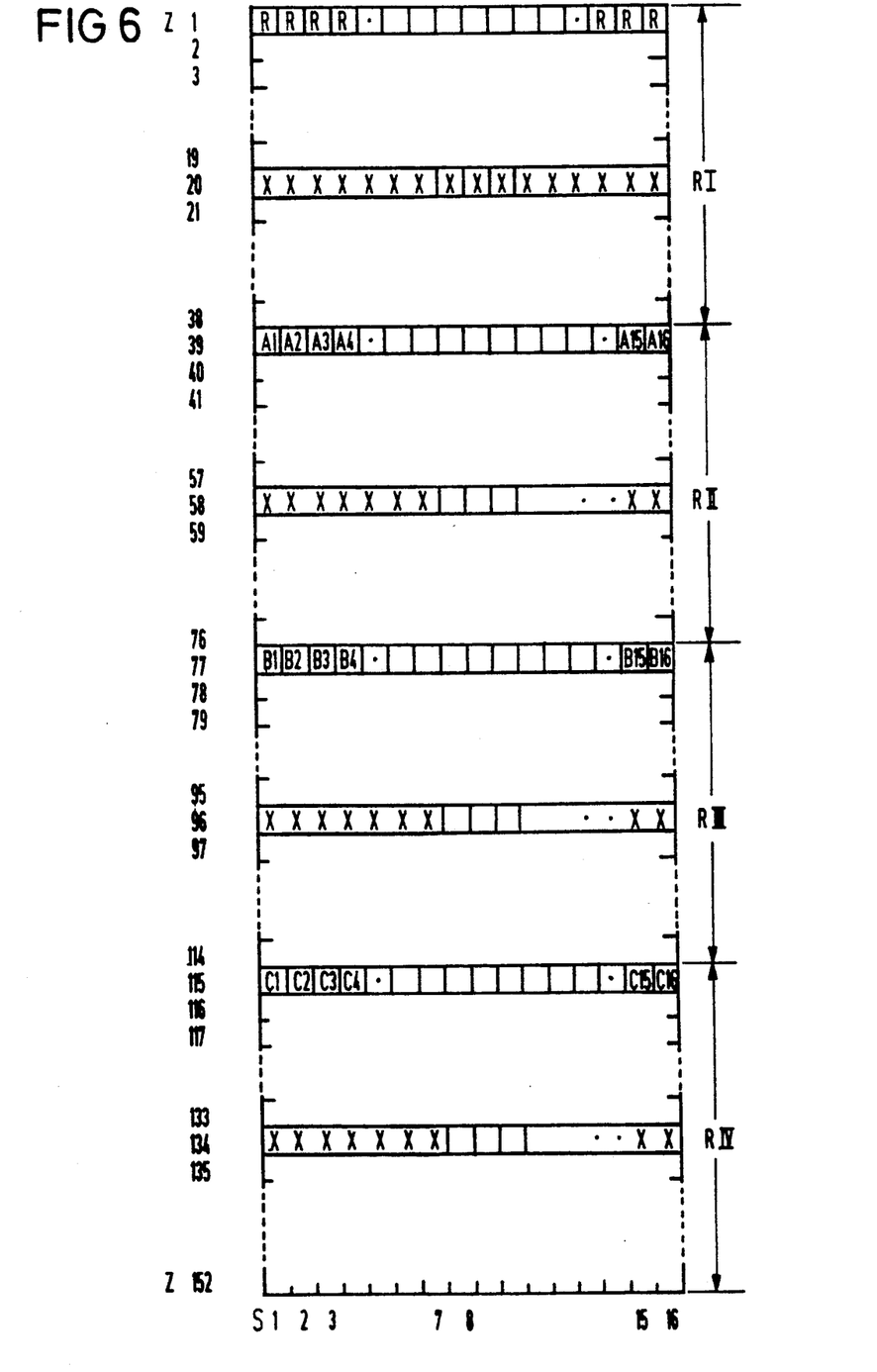
FIG. 6 depicts the frame division for signals TU-12, TU-22, TUG-22 and TUG-31.

FIG. 6 shows the division of the superframe for signals TU-12, TU-22, TUG-22 and TUG-31. The bytes of the auxiliary rows 20 of every frame remain unused for these signals. The transmission capacity that is then available amounts to 36×16 bytes =64×9 bytes per frame. This capacity is adequate for the insertion of sixteen TU-12, four TUG-22 or one TUG-31.

Figure 7:
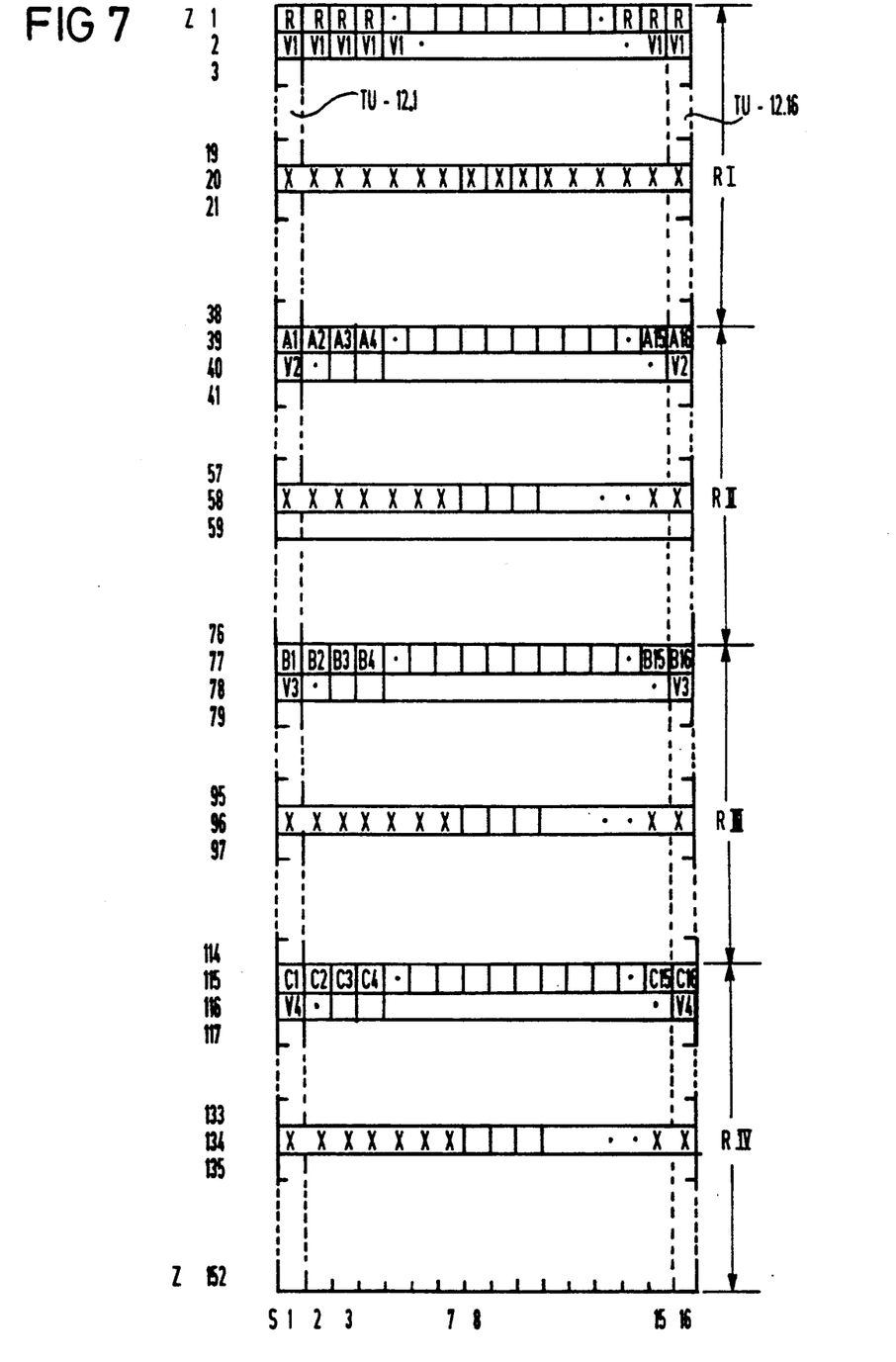
FIG. 7 depicts the arrangement of 16 TU-12 or, respectively, one TUG-31.

FIG. 7 shows the arrangement of 16 TU-12 (or, respectively, of one TUG-31). Every column serves for the transmission of one TU-12. The TU-12.1 is thus transmitted in the first column and the TU-12.16 is transmitted in column S16. The respectively appertaining pointers V1-V4 are respectively arranged in the appertaining column in the second rows of the frames RI through RIV.

Figure 8:
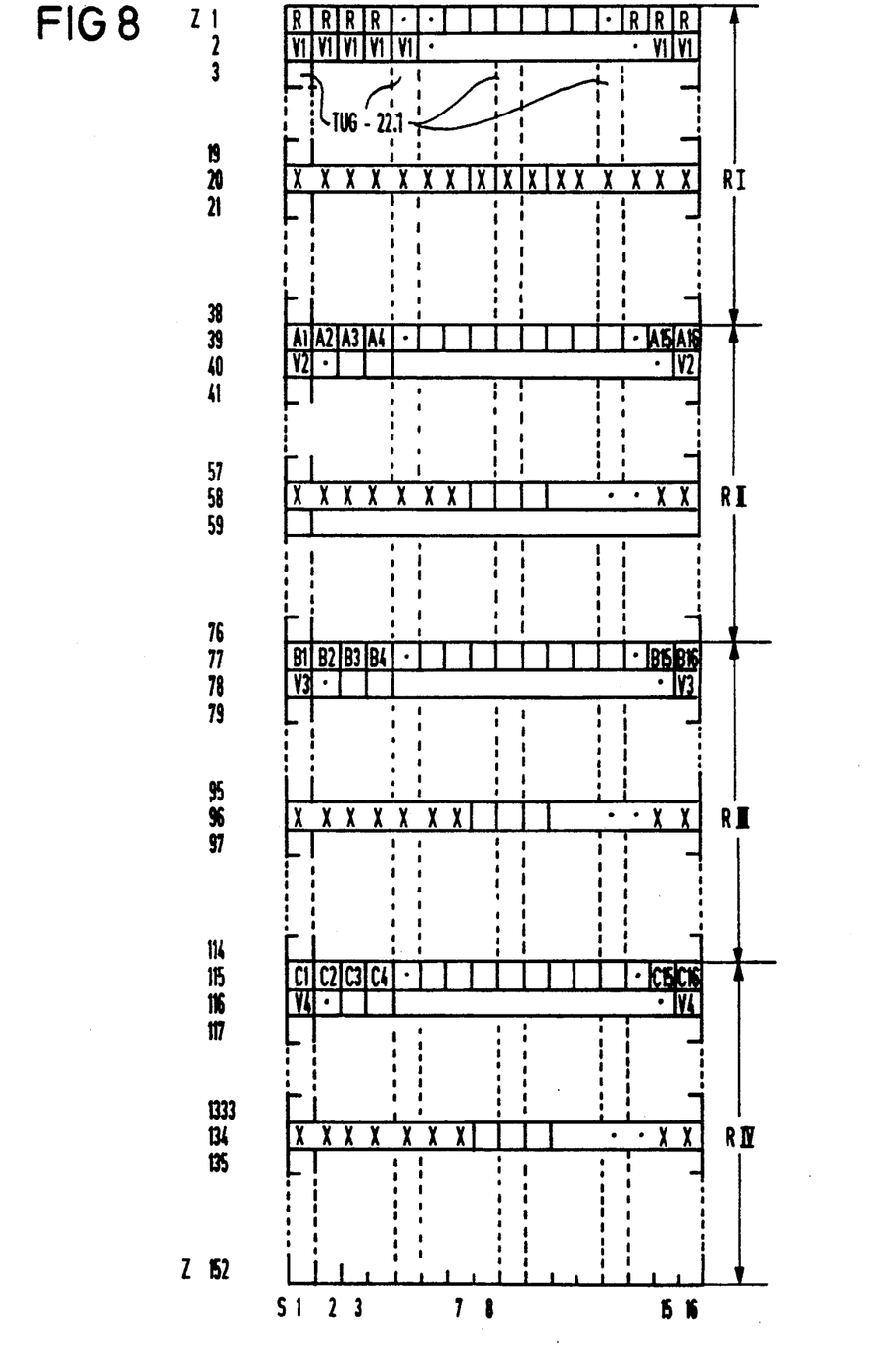
FIG. 8 depicts the arrangement of 4 TUG-22.

FIG. 8 shows the arrangement of four TUG-22. Four columns are required for each TUG-22, whereby the columns S1, S5, S9 and S13 are allocated to the first TUG-22, the columns S2, S6, S10 and S14 are allocated to the second TUG-22, the columns S3, S7, S11 and S15 are allocated to the third TUG-22 and the remaining columns are allocated to the fourth TUG-22. The first TUG-22.1 is entered in FIG. 1 by dotting the corresponding columns. The same column allocation is valid for the transmission of tributary units TU-22.

Before even further possibilities for the insertion of further cross-connect data blocks are considered, the problem of the through-connection shall be briefly discussed. This can only occur after the uniform synchronous data blocks were formed with the superframe RM. What are through-connected are either the complete superframe, individual columns (TU-12) or a plurality of columns (TU-22) that contain additional information about frame identifier, matrix path address and monitoring criterion (corresponding to the additional rows of the superframe). Upon through-connection of a TU-12, for example, the number of bytes increases from 144 to 152 and from 576 to 604 in the case of a TU-22. For transmission over the trunk line network, the through-connected data blocks were respectively combined to form a STM-1 signal.

Figure 9:
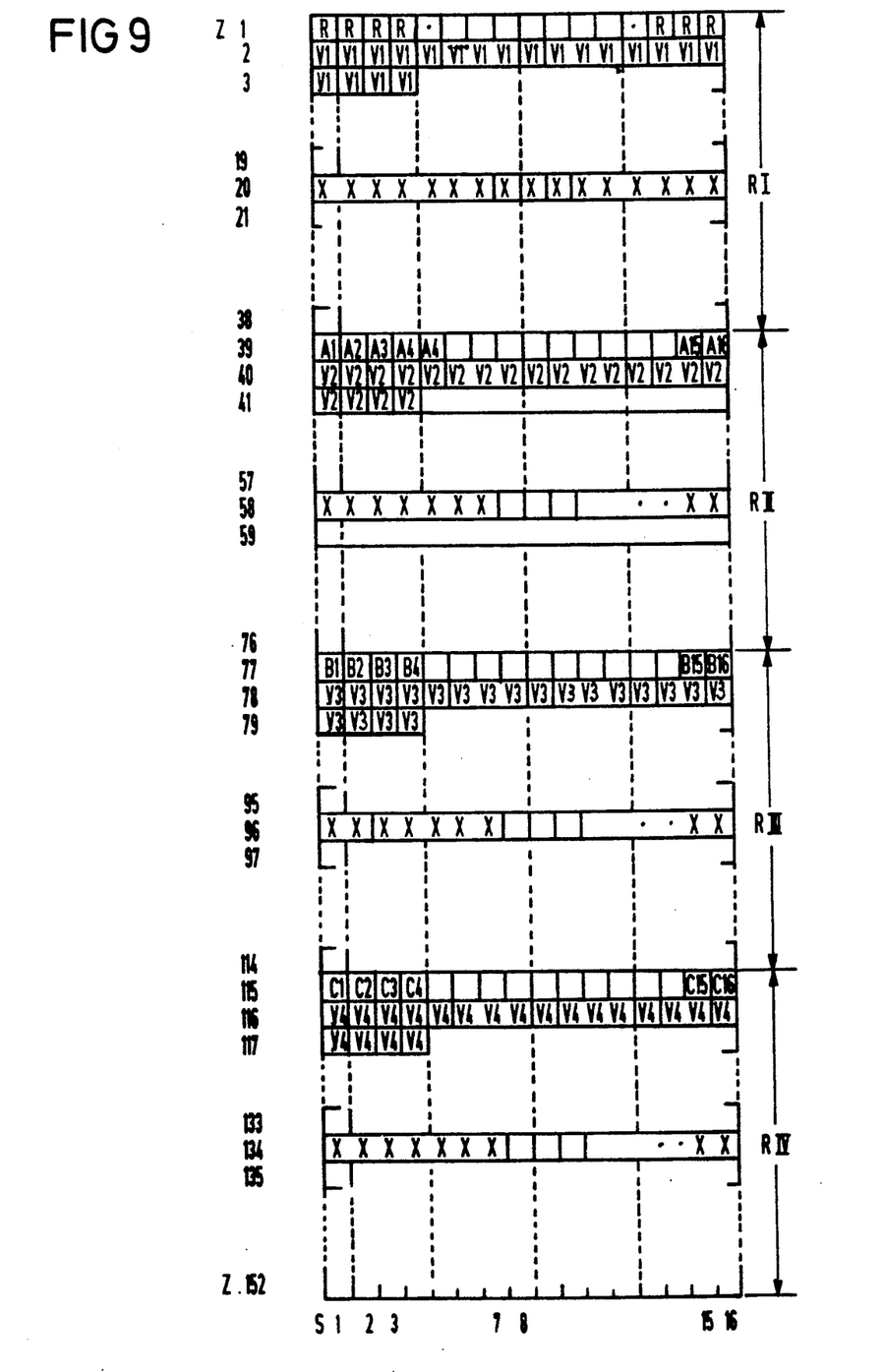
FIG. 9 depicts the arrangement of pointers for 5×TU-11.

According to CCITT G.709, FIG. 5.11, a TUG-22 can be formed of 5×TU-11 instead of being formed of 4×TU-12. In this case, respectively five pointers instead of four pointers are required. In FIG. 9, for example, the fifth pointers are respectively arranged in the first four bytes of the third row of each and every frame into which the respectively first, second, third and fourth bytes of the pointers are written. For mixed occupation, the corresponding pointers are eliminated. Respectively five TU-11 are contained in all TUG-22 in FIG. 9.

Figure 10:
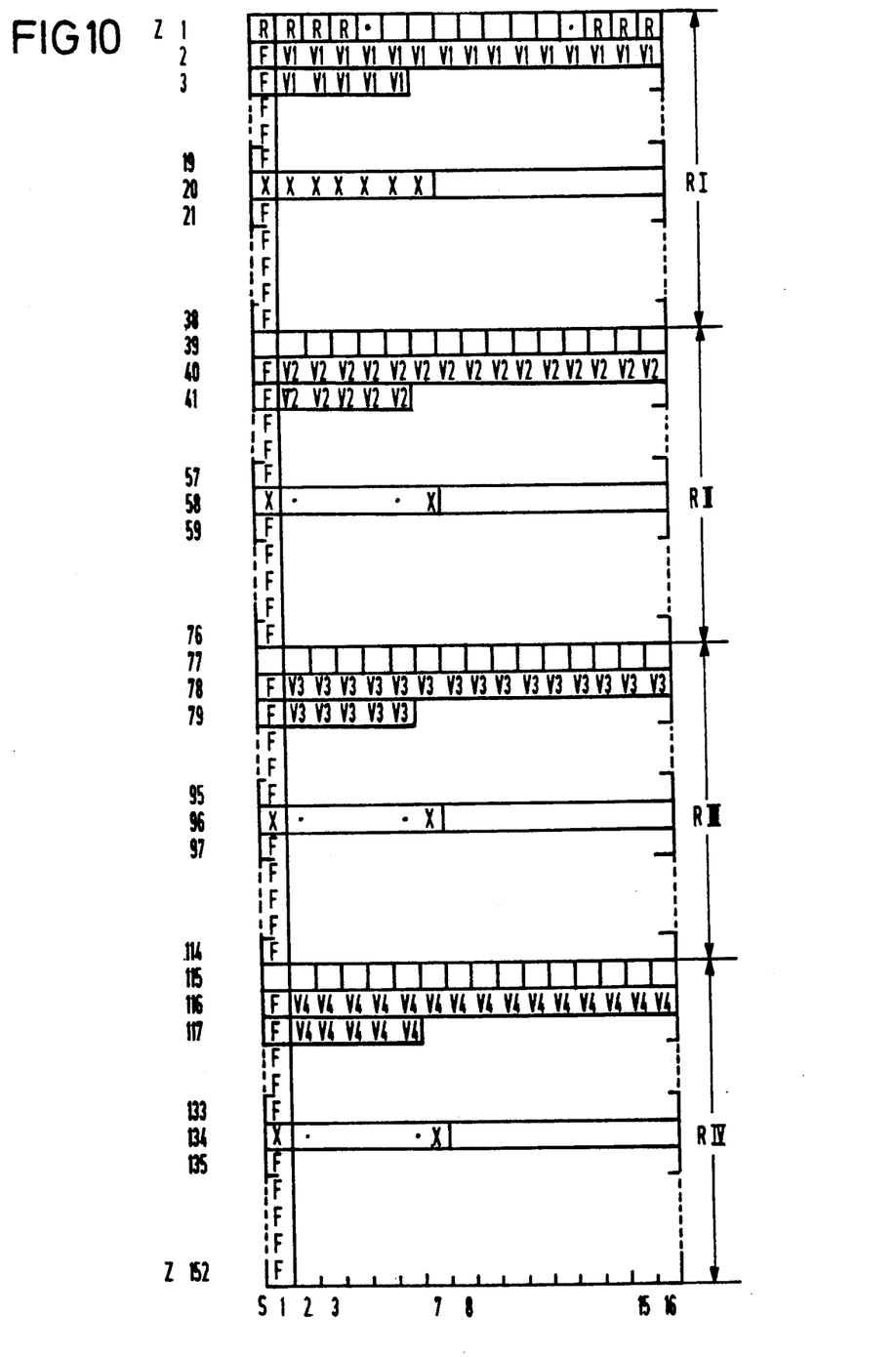
FIG. 10 depicts the arrangement of 5 TUG-21 into one TUG-31.

The insertion of five TUG-21 into the superframe SM for insertion into a TUG-31 is shown in FIG. 10. Upon transition from one hierarchy into the other, here from 1.5 Mbit/s into 2 Mbit/s, the superframe, RM in this case, of the hierarchy into which insertion is being carried out is always used. The information bytes of the first column are set here to a constant value (fixed fill). The pointers are respectively distributed onto two rows of a frame.

Figure 11:
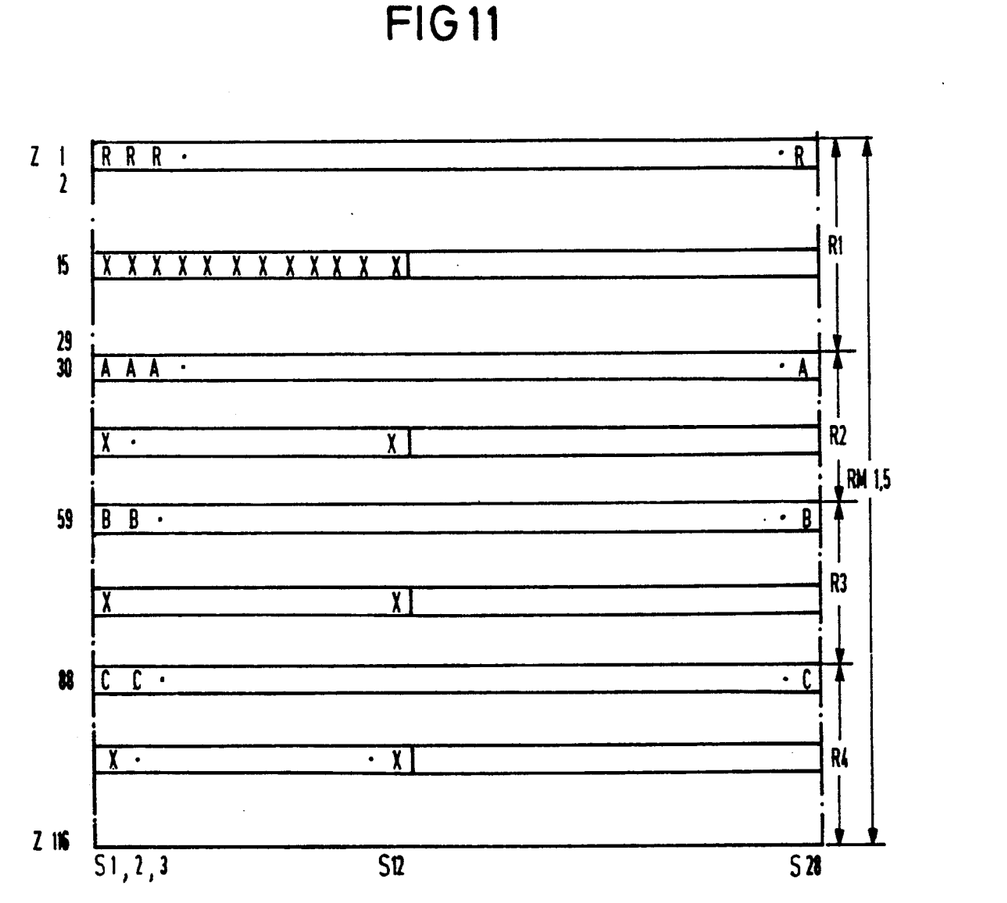
FIG. 11 depicts the superframe for the 1.5 Mbit/s hierarchy.

A similar superframe RM 1.5 can be constructed according to FIG. 11 for the 1.5 Mbit/s hierarchy; here, every superframe is composed of four frames R1-R4. Given use of only one auxiliary row, a frame is composed of a total of 29 rows and 28 columns, i.e. 29×28 bytes. 116×28 bytes are therefore to be transmitted per superframe given a superframe period of 2 kHz. The transmission rate amounts to 51 968 kbit/s (29×1792 kbit/s). This signal is referred to as DS 52. A row 15 is preferably employed here as auxiliary row. The frame identifier RR.... is assigned to the row Z1 of the frame R1. The respectively first row of the frames R2 and R3 is employed for the transmission of switching matrix network addresses and the first row of the frame R3 is used for the transmission of quality features. This superframe can be used for the transmission of one TU-32 or one TUG-32, of seven TUG-21 or of 28 TU-11.

As in the frame for the 2 Mbit/s hierarchy, the auxiliary rows are not used for information transmission for the transmission of 28 TU-11 or seven TUG-21 or one TUG-32. Here, too, the pointer values V1, V2, V3 and V4 then each respectively occupy an entire row having the same position in the frames R1 through R4. For the transmission of a TU-32, by contrast, 12 bytes of the auxiliary row of each and every frame are required. Three TU-12 can also be transmitted instead of one TUG-21.

The two superframes for the 2 Mbit/s hierarchy and the 1.5 Mbit/s hierarchy make it possible to construct a cross connector for each of the two hierarchies that, together with its switching matrix network, is in the position to throughconnect a TUG-31 or, respectively, TUG-32 as a whole or subdivided into TUG-22 or, respectively TUG-21 or subdivided into TUG-22 and TU-12 or, respectively, TUG-21 and TU-11. The cross connector for the 2 Mbit/s is thereby also in the position to through-connect 1 through 4 TUG-22 of a TUG-31 even when these are each respectively constructed of 5 TU-11. The through-connection of 1 through 7 TUG-21 or of one TUG-32, even when this contains three TU-12, corresponding applies to the 1.5 Mbit/s hierarchy.

It is also possible to through-connect five TUG-21 instead of one TUG-31. Since further TUGs are not currently defined, there through-connection is not possible.

None of the switching measures require an operation performed on the frame structure. TU-31 or, respectively AU-31 can also be through-connected across the switching matrix network with the employment of 9 bytes of the auxiliary row per frame for signal transmission i the 2 Mbit/s hierarchy. The AU-31 is referred to as administrative unit.

Given use of 12 bytes of the auxiliary rows, TU-32 or, respectively AU-32 can also be through-connected across the switching matrix network for the 1.5 Mbit/s hierarchy. The pointers can then be attached to the 12 bytes of the auxiliary row. The exact structure of the cross-connected data blocks to be through-connected can thereby be respectively derived from the recited references.

The invention is not limited to the particular details of the method depicted and other modifications and applications are contemplated. Certain other changes may be made in the above described method without departing from the true spirit and scope of t he invention herein involved. It is intended, therefore, that t he subject matter in the above depiction shall be interpreted as illustrative and not in a limiting sense.

What is claimed is:

1. A method for the through-connection of multiplex signals via cross connectors, comprising the steps of: converting data blocks of different multiplexing levels into cross-connect data blocks; ordering the cross-connect data blocks in a fixed superframe, the superframe being subdivided into four frames and having 116×28 bytes for use with a 1.5 Mbit/s hierarchy; providing, fixed time slots for the acceptance of pointers that define the beginning of the cross-connect data blocks; transmitting in a first row of the first frame a frame identifier word; and, respectively one row of further frames being available for special jobs; and compensating frequency deviations between external data signals and the superframe by positive-zero-negative filling.

2. The method according to claim 1, wherein, for the insertion of one of cross-connect data blocks corresponding to one tributary unit group TUG-33, cross-connect data blocks corresponding to seven tributary unit groups TUG-21, cross-connect data blocks corresponding to three tributary unit groups TUG-12, and cross-connect data blocks corresponding to twenty-weight tributary units TU-11, respectively one auxiliary row of every frame is not used for information transmission.

3. The method according to claim 2, wherein, for insertion of cross-connect data blocks corresponding to tributary unit TU-32, respectively 12 bytes of the auxiliary row are used for information transmission.

4. A method for the through-connection of multiplex signals via cross connectors, comprising the steps of converting data blocks of different multiplexing levels into cross-connect data blocks; ordering the cross-connect data blocks in a fixed superframe, the superframe having 152 rows each having respectively 16 columns corresponding to 152×16 bytes for a 2 Mbit/s hierarchy and the superframe being subdivided into four frames; transmitting a frame identifier in a first row of the first frame, respectively one row of the remaining frames and respectively 7 bytes of an auxiliary row of every frame being available for special jobs; and compensating frequency deviations between external data signals and the superframe by positive-zero-negative filling.

5. The method according to claim 4, wherein virtual contains VC-31 are formed that contain at least the data blocks, and wherein each frame has three bytes, two bytes thereof for defining the beginning of a virtual container VC-31 and one byte thereof being used for filling, and wherein the three bytes are provided at a permanently prescribed location of every frame for accepting pointers for insertion of four cross-connect data blocks that correspond to virtual containers VC-31.

6. The method according to claim 4, wherein the auxiliary rows of every frame are used for other than the transmission of useful data given insertion of cross-connect data blocks corresponding to one of tributary unit TU-22, tributary unit group TUG-22, tributary unit group TUG-31 and tributary unit TU-12.

7. The method according to claim 6, wherein, given the insertion of cross-connect data blocks corresponding to one of tributary unit TU-22, tributary unit group TUG-22, tributary unit group TUG-31 and tributary unit TU-12, one row of every frame is employed for the transmission of the respective pointer that is four bytes long and is respectively allocated column-by-column; and wherein the transmission of the cross-connect data blocks respectively occurs by transmission of one column or of a plurality of columns of a superframe.

8. The method according to claim 6, wherein, for the transmission of cross-connect data blocks that correspond to five tributary units, respectively one row and four bytes of a further row of every frame are provided for the insertion of the pointers.

9. The method according to claim 6, wherein, for the insertion of cross-connect data blocks corresponding to five tributary unit groups TUG-21, the information bytes of a predetermined column are set to a fixed value.

10. A method for the through-connection of multiplex signals via cross connectors, comprising the steps of converting data blocks of different multiplexing levels into cross-connect data blocks; ordering the cross-connect data blocks in a fixed superframe, the superframe having 152 rows each having respectively 16 columns corresponding to 152×16 bytes for a 2 Mbit/s hierarchy, the superframe being subdivided into four frames; transmitting a frame identifier in a predetermined row of a predetermined frame of the four frames; providing fixed time slots for pointers that define beginnings of the cross-connect data blocks; and compensating frequency deviation between external data signals and the superframe by positive-zero-negative stuffing.

11. The method according to claim 10, wherein virtual containers VC-31 are formed that contain at least the data blocks, and wherein each frame has three bytes, two bytes thereof for defining a beginning of a virtual container VC-31 and one byte thereof being used for filling, and wherein for the through-connection of the virtual containers VC-31, a frame identifier is transmitted in a first row of the first frame, one row of each remaining frame and 7 bytes of an auxiliary row of every frame being available for special information; the pointers being the two bytes in every frame defining the beginning of the virtual container VC-31.

12. The method according to claim 10, wherein, for the insertion of cross-connect data blocks corresponding to one of tributary unit TU-22, tributary unit group TUG-22, tributary unit group TUG-31 and tributary unit TU-12 one row of every frame is employed for the transmission of the respective pointer that is four bytes long and is respectively allocated column-by-column; and wherein the transmission of the cross-connect data blocks respectively occurs by transmission of one column or of a plurality of columns of a superframe.

13. The method according to claim 10, wherein, for the transmission of cross-connect data blocks that correspond to five tributary units TU-11, respectively one row and four bytes of a further row of every frame are provided for the insertion of pointers.

14. The method according to claim 10, wherein, for the insertion of cross-connect data blocks that correspond to five tributary unit groups TUG-21, the information bytes of a predetermined column are set to a fixed value.

15. The method according to claim 13, wherein for the insertion of cross-connect data blocks corresponding to one of tributary unit TU-22, tributary unit group TUG-22, tributary unit group TUG-31 and tributary unit TU-12 the auxiliary rows of every frame are used for other than the transmission of useful data of the cross-connect data blocks.

16. The method according to claim 13, wherein one row of every further frame is available for special information.

17. The method according to claim 14, wherein for the insertion of cross-connect data blocks corresponding to one of tributary unit TU-22, tributary unit group TUG-22, tributary unit group TUG-31 and tributary unit TU-12 the auxiliary rows of every frame are used for other than the transmission of useful data of the cross-connect data blocks.

18. The method according to claim 14, wherein one row of every further frame is available for special information.

19. A method for the through-connection of multiplex signals, comprising the steps of: converting data blocks of different multiplexing levels into cross-connect data blocks; ordering the cross-connect data blocks in a fixed superframe, the superframe having 116 rows each having 28 bytes of a 1.5 Mbit/s hierarchy, the superframe being subdivided into four frames; transmitting a frame identifier in a predetermined row of a predetermined frame of the four frames; providing fixed time slots for the acceptance of pointers that define beginnings of the cross-connect data blocks; and compensating frequency deviation between external data signals and the superframe by positive-zero-negative stuffing.

20. The method according to claim 19 wherein a first row of the first frame contains the frame identifier and wherein respectively one row of further frames is available for special jobs.

21. The method according to claim 20, wherein, for the insertion of one of cross-connect data blocks corresponding to one tributary unit group TUG-32, cross-connect data blocks corresponding to seven tributary unit groups TUG-21, cross-connect data blocks corresponding to three tributary unit groups TUG-12, and cross-connect data blocks corresponding to twenty-eight tributary units TU-11, respectively one auxiliary row of every frame is not used for information transmission.

22. The method according to claim 20, wherein, for insertion of cross-connect data blocks corresponding to tributary units TU-32, respectively 12 bytes of the auxiliary rows are used for information transmission.

* * * * *